United States Patent [19]

Oliver

[11] Patent Number: 4,577,834

[45] Date of Patent: Mar. 25, 1986

[54] DOWNSTREAM SEALING DEVICE

[76] Inventor: John P. Oliver, 37 Stillforest, Houston, Tex. 77024

[21] Appl. No.: 704,915

[22] Filed: Feb. 25, 1985

Related U.S. Application Data

[63] Continuation-in-part of Ser. No. 300,215, Sep. 8, 1981, abandoned.

[51] Int. Cl.$^4$ ................................................ F16K 3/20
[52] U.S. Cl. .................................... 251/175; 251/327; 251/195; 251/328
[58] Field of Search ............... 251/175, 172, 328, 327, 251/174, 195, 170

[56] References Cited

U.S. PATENT DOCUMENTS

| | | | |
|---|---|---|---|
| 3,132,837 | 5/1964 | Britton | 251/174 X |
| 3,215,157 | 11/1965 | Anderson et al. | 251/328 X |
| 3,228,652 | 1/1966 | Antrim | 251/175 |
| 3,307,826 | 3/1967 | Lowrey | 251/172 X |
| 3,658,087 | 4/1972 | Nelson | 251/327 X |
| 3,834,664 | 9/1974 | Atkinson | 251/172 X |
| 4,068,821 | 1/1978 | Morrison | 251/172 |

Primary Examiner—Arnold Rosenthal
Attorney, Agent, or Firm—Vaden, Eickenroht, Thompson & Jamison

[57] ABSTRACT

There are disclosed alternative embodiments of a downstream sealing gate valve of the type in which a pair of seats are carried within the body of the valve for sealing between the body and either side of the gate.

8 Claims, 5 Drawing Figures

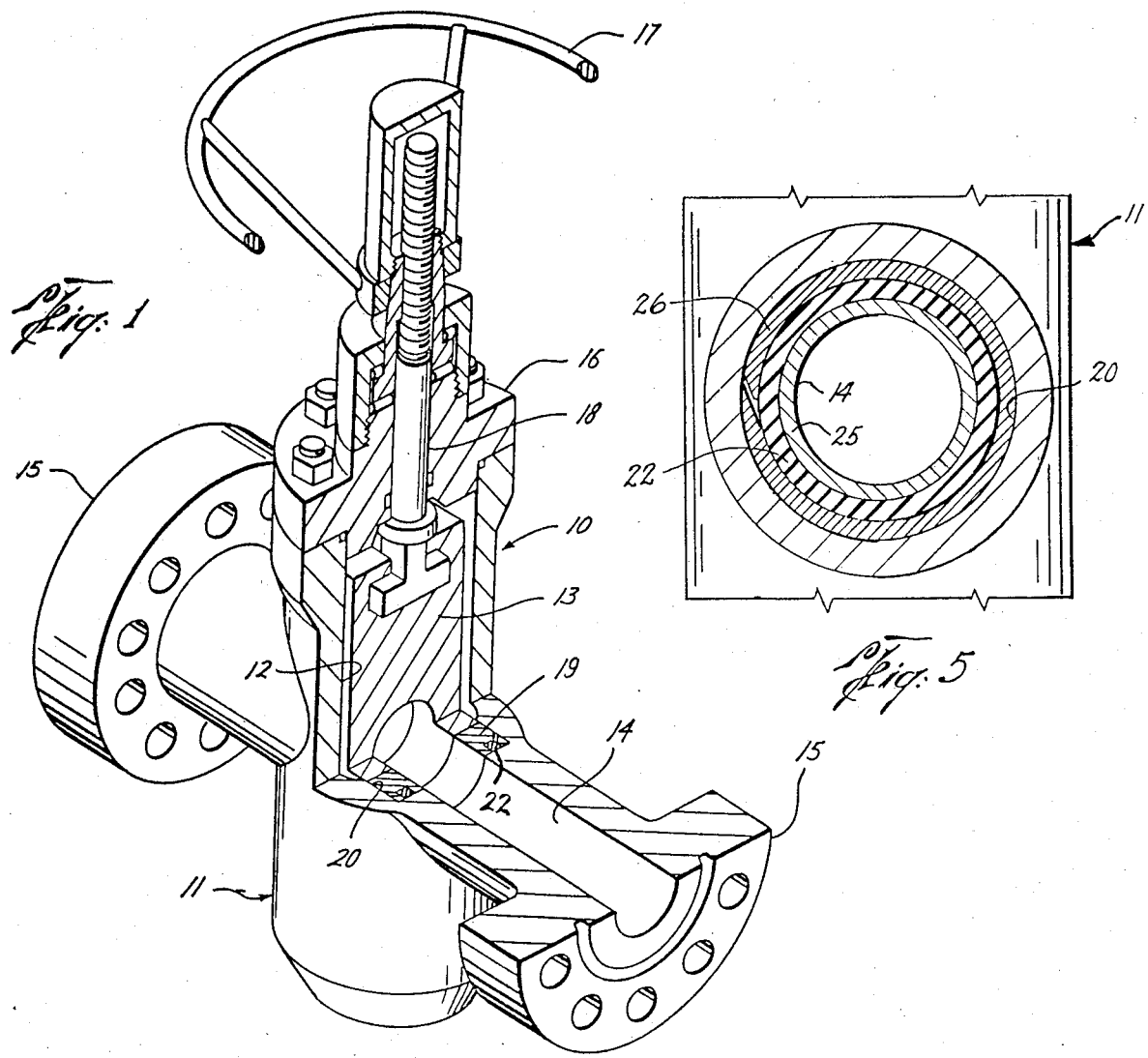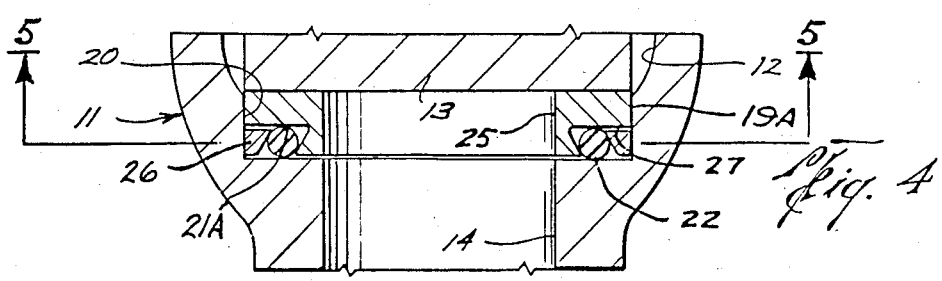

DOWNSTREAM SEALING DEVICE

This application is a continuation-in-part of my copending application, Ser. No. 300,215, filed Sept. 8, 1981, now abandoned and entitled "Downstream Sealing Device".

This invention relates to valves of the type which, when closed, seal on the downstream side of the closure member. More particularly, it relates to improvements in valves of this type in which a pair of seats are carried within the body of the valve for sealing between the body and either side of a gate or other member which opens and closes a flowway through the body.

Ordinarily, in a valve of this type, a sealing member is carried about the outer diameter of each seat and/or an oppositely facing annular surface of the valve body within which it is carried so as to maintain a sliding seal therebetween as the seat moves axially toward and away from the side of the closure member. When the valve is closed, upstream line pressure acts across an area circumscribed by the outer diameter of the seat. As a result, the operator for the gate must be quite large and expensive in order to overcome the large frictional force resisting opening movement of the closure member. It is therefore the primary object of this invention to provide a gate valve of this type in which the power required to open the valve is minimized.

In accordance with my invention, the sealing member is located within a groove in the outer end of each seat, so that, when the valve is closed and the gate is urged into tight sealing engagement with a bearing surface on the inner end of the downstream seat under high line pressures ordinarily encountered, the gate deflects within the opening through the downstream seat and line pressure bypasses the upstream seat and flows between increasingly larger annular areas between the gate and the bearing surface on the outer end of the downstream seat. Thus, the gate is urged against the downstream seat by means of line pressure acting over a relatively small area somewhat larger than the inner diameter of the seat, and therefore substantially less force is required to move the closure member than in the gate valve construction above described.

More particularly, the bearing surfaces on the inner ends of the seats have metal to metal engagement with opposite sides of the gate, so that in the event the line in which the valve is installed is also closed at a location upstream thereof, and line pressure between such closure and the valve is bled off to atmosphere, the sealing members carried by the outer ends of both seats may sealably engage their oppositely facing body surfaces. As a result, high pressure line fluid may be trapped in the cavity of the valve body, creating forces urging the seats against the closure member which are dependent on the annular areas between the outer diameters of the inner bearing surfaces of the seats and the intersection of the inner diameters or walls of the seat grooves with the outer bearing surfaces. Thus, the operator could be underpowered or overpowered, depending on whether it is designed to overcome the force due to line pressure acting over the upstream side of the closed gate, or designed to overcome the force due to line pressure trapped in the cavity.

According to my invention, however, the groove in each seat is so located that the area within the intersection of the inner diameter or wall of the seat groove is substantially equal to the inner diameter of the seat itself. More particularly, it is approximately twice the area between the outer diameter of the inner bearing surface of each seat and the intersection of the inner diameter of the groove in the seat with the outer bearing surface. Consequently, when the closure member is in flowway closing position, the force with which it is urged against the downstream seat by upstream line pressure is approximately equal to the force with which both seats are urged against the closure member due to line pressure trapped within the cavity of the valve body, whereby the power requirements of the operator are essentially the same in both instances.

In the preferred and illustrated embodiment of the invention, port means connect the bottom of each groove adjacent its outer diameter with the outer diameter of the seat. As will be explained in detail to follow, this insures that line pressure acts over the aforementioned pressure responsive areas of one or both of the seats, whether such pressure is on the upstream side of the gate or trapped in the body cavity.

In an alternative embodiment of the invention, each seat comprises a main ring having a center opening in alignment with the flowway and a notch at the intersection of the outer end of the seat with its outer diameter, and a retainer ring fittable within a radially outer portion of the notch, the retainer ring and notch forming the radially outer and inner side walls, respectively, of the groove which taper radially outwardly in a direction from the inner to the outer end of the seat. More particularly, the intersection of the inner side wall of the groove with the bearing surface of the main ring of the seat has a diameter greater than the inner diameter of the seal member, the intersection of the outer side wall of the groove with the bottom of the groove is less than the outer diameter of the seal member, and the retainer ring and notch in the main ring provide a bypass between them which forms the aforementioned port means so as to insure that line pressure acts over the intended pressure responsive area.

Valves of this type area often located with their gates essentially horizontal so that the upper seat must be held within a recess in the valve body prior to installation of the gate. In order to fascilitate this type of installation, the retainer ring of at least one of the seats constructed in accordance with the above described alternative embodiment of the invention is split about its circumference so that it is outwardly biased into frictional engagement with the annular recess in the body in which it's received, and thus held within the upper recess as the gate is installed.

In the drawings, wherein like reference characters are used throughout to designate like parts:

FIG. 1 is a perspective view of a valve constructed in accordance with the present invention, with a portion thereof broken away to illustrate the arrangement of one of the seats within the valve body;

FIG. 4 is a cross-sectional view, similar to FIGS. 2 and 3, but showing the alternative seat ring construction; and FIG. 5 is a cross-sectional view of the valve of FIG. 4, as seen along broken lines 5—5 of FIG. 4.

Figure 2:
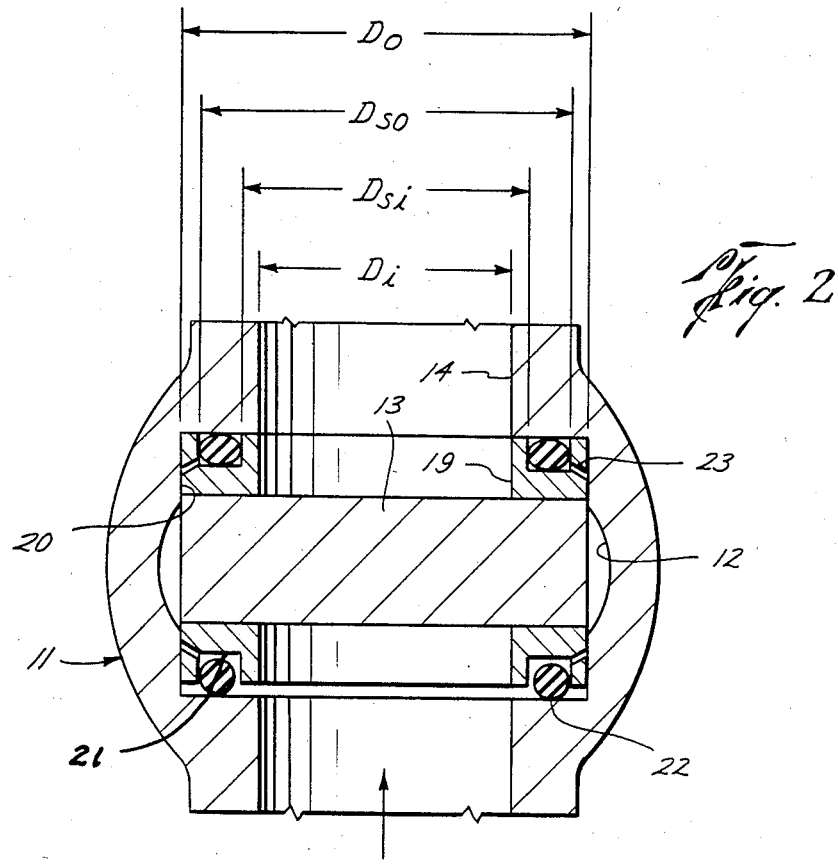
FIG. 2 is an enlarged cross-sectional view of a portion of the valve body in which the cavity is formed to receive the gate, and wherein line pressure on the upstream side of the closed gate is urging it into sealing engagement with the downstream seat.

The gate valve 10 shown in FIG. 1 includes a body 11 in which a cavity 12 is formed to receive a gate 13 for moving between positions opening and closing the flowway 14 through a flowway which connects with opposite sides of the cavity. The body has end connections such as the flanged hubs 15 through which the outer ends of the flowway extend.

Figure 3:
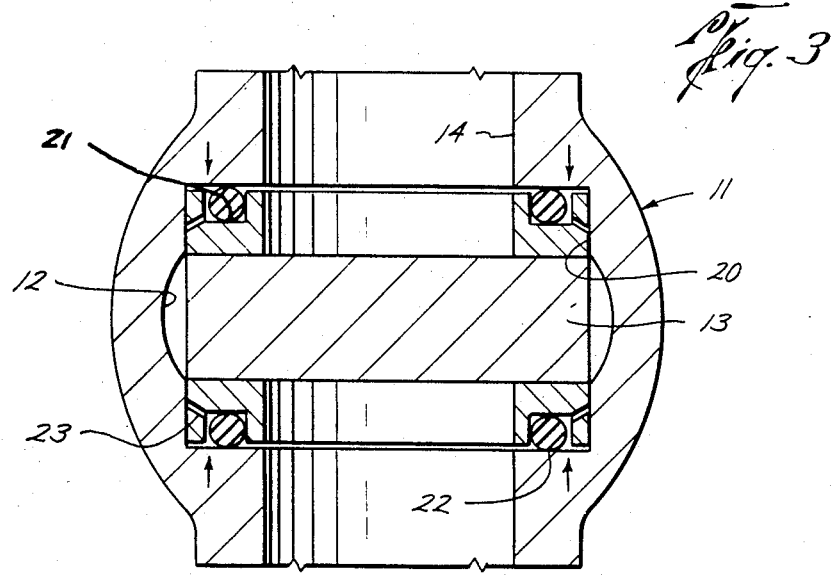
FIG. 3 is another enlarged cross-sectional view similar to FIG. 2, but with line pressure trapped within the body cavity to urge both seats into sealing engagement with opposite sides of the gate.

A bonnet 16 is mounted on the upper end of the valve body to enclose the open, upper end of the gate cavity and to support a handwheel 17 or other operator connected to the gate by a stem 18. The gate has a port therein which is adapted to be moved into and out of a position aligned with the flowway by manipulation of the handwheel 17 to raise or lower the stem. As shown in FIGS. 2 and 3, seats 19 are carried within recesses 20 in the inner ends of the flowway intersections with the cavity for engaging opposite the faces of the gate.

The inner diameters $D_i$ of the seats 19 are approximately the same as the diameter of the flowway and the port through the gate so as to form a smooth opening through the valve in the open position of the gate (FIG. 1). Of course, when the gate is closed, a solid portion thereof is disposed across the openings through the seats, as shown in each of FIGS. 2 and 3.

As above described, each seat has an annular groove 21 formed in its outer end facing the outer end of the recess 20 in which it is received. More particularly, an O-ring type sealing member 22 received within the groove is of a diameter somewhat greater than the depth of the groove, so that it will protrude from the groove and form an initial interference seal between the seat and the body, even though the outer end of the seat may be spaced a short distance from the outer end of the recess. As shown in FIG. 2, line pressure has urged both seats and the gate in a downstream direction so that there is a relatively large space between the outer end of the upstream seat and its recess, which, under ordinary circumstances, will permit line pressure to pass between the upstream O-ring 22 and the adjacent end of the recess.

Preferably, the inner diameter or wall of the groove in the downstream seat is close to the inner diameter $D_i$ of the seat, but nevertheless spaced therefrom a distance which maintains enough wall thickness to prevent failure. In any event, the force with which the gate is initially urged against the downstream seat is equal to the line pressure times the area circumscribed within the outer diameter $D_o$ of the seat. Thus, the force which is initially required of the operator in moving the gate from its closed to its open position is equal to this force times the coefficient of friction between the downstream side of the gate and the inner end of the seat against which it is urged. However, as pressure builds up on the upstream side of the gate, it will deflect and thus permit upstream pressure to gradually seep between the gate and downstream seat, so that the required force is lessened by an amount dependent on the extent to which the gate is flexed.

In the alternative circumstance previously described, wherein pressure on both sides of the closed gate is atmospheric, or at any higher level, the gate does not deflect and the seats will tend to assume a more balanced position in a direction axially of the flowway. Thus, as shown in FIG. 3, the outer end of each seat may be spaced only a relatively short distance from the adjacent end of its recess. As a result, the O-rings 22 of the seats may sealably engage the ends of the recesses, and thus trap line pressure within the body cavity, which in turn would act over portions of the outer ends of the seats to urge them into tight sealing engagement with opposite sides of the gate, as illustrated by the arrows in FIG. 3. More particularly, line pressure trapped within the body cavity would urge the O-rings radially inwardly toward the axis of the seat so as to form a tight seal at the inner diameter $D_{si}$ of the groove in the seat.

The forces urging the seats against the gate would be equal to line pressure times twice the annular area defined between the outer diameter $D_o$ of each seat and the inner diameter $D_{si}$ of the groove in the seat, so that the total force due to frictional engagement between the seats and the gate which must be overcome by the power operator is equal to these forces times the above-mentioned coefficient of friction between the seats and the gate. As previously mentioned, however, and, in accordance with this invention, the groove and O-ring of each seat are so arranged that the area circumscribed by $D_{si}$, which is substantially equal to $D_i$, is approximately twice the annular area between $D_o$ and $D_{si}$, so that, when the gate is deflected, the power requirements of the operator for opening the gate in either situation are essentially the same.

As also previously mentioned, each seat is provided with ports 23 which connect the outer diameter $D_{so}$ or wall of the groove near its bottom wall with the outer diameter of the seat. Thus, for example, even if the inner end of the upstream seat is sealably engaged against the seat due to upstream pressure, and the upstream O-ring 22 extrudes into the space between the outer end of the seat and the adjacent outer end of the recess, upstream line pressure may nevertheless pass around the bottom of the O-ring and through ports 23 in the upstream seat. Conversely, line pressure within the body cavity may pass through the ports into the groove for each O-ring to cause the O-ring to seal between the seat and gate at the inner diameter of the groove even if the O-ring has extruded into the space between the outer end of the seat and the outer end of the recess. Hence, as previously mentioned, the ports 23 insure that line pressure, whether on the upstream side of the gate, as illustrated in FIG. 2, or trapped within the valve body cavity, as illustrated in FIG. 3, has access to the above-described pressure responsive areas on one or both of the O-rings in order to accomplish the purposes of this invention.

As shown in FIGS. 4 and 5, the body 11 of the valve in which alternative seats 19A are carried may be identical to that above described in that it has a cavity 12 in which a gate 13 is movable between the seats for opening the closing flowway 14 though the body. As previously described, this alternative embodiment of the seat comprises a main ring 25 having a center opening or inner diameter which is aligned with the flowway 14, and a notch 27 at the intersection of the outer end of the seat with its outer diameter, and a retainer ring 26 which fits within a radially outer portion of the notch. Thus, as shown in FIG. 4, the retainer ring and the notch form the radially inner and outer walls of a groove 21A for the seal ring 22 in the outer end of the seat.

However, as compared with groove 21 in the outer end of the seat 19, grooves 21A have side walls which taper radially outwardly in a direction from the inner to the outer end of the seat. As also shown in FIG. 4, the intersectionn of the inner side wall of the groove with the bearing surface on the outer end of the seat has a diameter greater than the inner diameter of the seal ring 22. Thus, in assembly of the seat, the seal ring 22 is stretched to move over this intersection and thus into the position shown in which it is held against accidental displacement. Also, the intersection of the outer side wall of the groove formed on retainer ring 26 with the bottom of the groove is less than the inner diameter of the seal ring. Consequently, the seal ring serves to prevent accidental displacement of the retainer ring, and the retainer ring is assembled by forcing it concentrically past the protruding outer diameter of the O-ring and into a position within the notch.

In the illustrated embodiment of the invention, the retainer ring 26 is somewhat thinner in a direction axially of the seat than is the depth of the notch. Consequently, a bypass is provided between the retainer ring and the bottom of the notch for the passage of line fluid therethrough, for purposes previously described in connection with ports of the embodiment of the seat illustrated in FIGS. 2 and 3.

As shown in FIG. 5, retainer ring 26 is split about its circumference and is biased outwardly into frictional engagement with the outer wall of the seat recess. Thus, when unstressed, the outer diameter of the ring is somewhat greater than the inner diameter of the recess, so that, when the seat is installed on its side in an upper recess, it will be retained in that position as the gate is installed.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As may possible embodiments may be made of the invention without departing from the scope thereof, it is to be understood that all matter herein set forth or shown in the accompanying drawings is to be interpreted as illustrative and not in a limiting sense.

The invention having been dscribed, what is claimed is:

1. A downstream sealing valve, comprising a body having a flowway therethrough and a cavity therein intersecting the flowway, a closure member received within the cavity for movement between the flowway opening and closing positions, and a pair of seats carried within the body each having an inner end with a bearing surface facing one side of the gate and an outer end with a bearing surface facing an annular surface of the body, the outer bearing surface of each seat having an annular groove therein, having radially inner and outer side walls which extend inwardly from the outer bearing surface and a bottom wall extending between the side walls, a seal member carried within each groove and being thicker than the depth of the groove so as to protrude from the outer bearing surface when unstressed, said closure member and seats being free to float in the direction of the flowway, so that, when the closure member is in flowway closing position, one side of the closure member will be urged by upstream line pressure against the downstream seat, each seat having means fluidly connecting the groove near its bottom wall with the exterior of the seat radially outwardly of the engagement of the seal member within said groove with the opposite annular surface of the body, and the bearing surfaces on the inner ends of the seats having metal-to-metal engagement with opposite sides of the closure member.

2. A valve of the character defined in claim 1, wherein each seat comprises a one piece ring, and the fluid connecting means comprises a port in the ring.

3. A valve of the character defined in claim 1, wherein each seat comprises a main ring having a notch at the intersection of its outer end with its outer diameter, and a retainer ring fittable within a radially outer portion of the notch, said retainer ring and notch forming the radially outer and inner side walls, respectively, of the groove which taper radially outwardly in a direction from the inner to the outer end of the seat, the intersection of the inner side wall of the groove with the bearing surface on the main ring of the seat having a diameter greater than the inner diameter of the seal member, the intersection of the outer side wall of the groove with the bottom of the retainer ring being less than the outer diameter of the seal member, and the fluid connecting means comprising a space between the retainer ring and notch in the main ring.

4. A valve of the character defined in claim 3, wherein the valve body has annular recesses in which the seats are closely received, and the retainer ring of at least one seat is split about its circumference so as to be biased outwardly into frictional engagement with the recess in which that seat is received.

5. For use in a downstream sealing valve, a seat having a bearing surface on each end, an annular groove in the bearing surface on one such end having radially inner and outer walls which extend inwardly from the outer bearing surface and a bottom wall extending between the side walls, a seal member carried within the groove and being thicker than the depth of the groove so as to protrude from the bearing surface on said one end, when unstressed, the bearing surface at the outer end of the seat being adapted to form a metal-to-metal seal with an adjacent surface of a closure member of the valve, and means providing a fluid bypass in the seat connecting the groove near its bottom wall with the exterior of the seat radially outwardly of the protruding area of the seal member within the groove.

6. A seat of the character defined in claim 5, comprising a one piece ring, and the bypass is a port in the ring.

7. A seat of the character defined in claim 5, comprising a main ring having a center opening and a notch at the intersection of its one end with its outer diameter, and a retainer ring fittable within a radially outer portion of the notch, said retainer ring and notch forming the radially outer and inner side walls, respectively, of the groove which taper radially outwardly in a direction from the one end to the other end of the seat, the intersection of the inner side wall of the groove with the bearing surface on the main ring of the seat having a diameter greater than the inner diameter of the seal member, the intersection of the outer side wall of the groove with the bottom of the retainer ring being less than the outer diameter of the seal member, and the fluid bypass comprises a space between the retainer ring and notch in the main ring.

8. A seat of the character defined in claim 7, wherein the retainer ring is split about is circumference so that, when unstressed, its outer diameter extends beyond the outer diameter of the main ring.

* * * * *